(12) United States Patent    (10) Patent No.: US 9,039,205 B2
Huang    (45) Date of Patent: May 26, 2015

(54) PROJECTOR SYSTEM AND PORTABLE ELECTRONIC DEVICE HAVING SAME

(75) Inventor: Yung-Lun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 306 days.

(21) Appl. No.: 13/527,879

(22) Filed: Jun. 20, 2012

(65) Prior Publication Data

US 2013/0250256 A1    Sep. 26, 2013

(30) Foreign Application Priority Data

Mar. 20, 2012    (TW) .............................. 101109430 A

(51) Int. Cl.
*G03B 21/14*    (2006.01)
*G03B 21/20*    (2006.01)

(52) U.S. Cl.
CPC ............ *G03B 21/20* (2013.01); *G03B 21/2066* (2013.01); *G03B 21/2006* (2013.01)

(58) Field of Classification Search
CPC ... G03B 21/14; G02B 27/0994; H04N 9/3197
USPC ........................................ 353/29, 39, 82, 119
See application file for complete search history.

(56) References Cited

U.S. PATENT DOCUMENTS

| | | | |
|---|---|---|---|
| 6,369,866 B1* | 4/2002 | Rai et al. ......................... | 349/61 |
| 2007/0091635 A1* | 4/2007 | Ladouceur et al. ........... | 362/557 |
| 2007/0146641 A1* | 6/2007 | Wang .............................. | 353/29 |
| 2010/0306022 A1* | 12/2010 | Plut ................................. | 705/10 |
| 2011/0241990 A1* | 10/2011 | Huang ........................... | 345/158 |

\* cited by examiner

*Primary Examiner* — Sultan Chowdhury
*Assistant Examiner* — Danell L Owens
(74) *Attorney, Agent, or Firm* — Novak Druce Connolly Bove + Quigg LLP

(57) ABSTRACT

A projector system of the present disclosure includes a light source unit, an imaging unit and a projection lens. The light source unit provides projected light. The light source unit includes a number of converging lenses and a light guiding member. The converging lenses gather and converge outside light into the light guiding member, and the light guiding member is configured for guiding light converged by the converging lenses to the imaging unit. The imaging unit is configured for modulating light from the light source with image information. The projection lens is configured for projecting modulated light out of the projector system. The present disclosure also relates to an portable electronic device having the projector system.

20 Claims, 2 Drawing Sheets

PROJECTOR SYSTEM AND PORTABLE ELECTRONIC DEVICE HAVING SAME

BACKGROUND

1. Technical Field

The present disclosure relates to a projector system and a portable electronic device having the projector system.

2. Description of Related Art

Many portable electronic devices, such as mobile phones, notebook computers etc., have built-in projector systems. Such projector systems are power-hungry. Portable electronic devices may employ portable power sources, such as batteries with limited capacities, so as not to reduce portability. The employment of the projector system may greatly shorten the endurance of the portable power source. The problem can be solved by increasing the capacity of the portable power sources. However, the miniaturization of the portable electronic device suffers as the capacity and therefore size of the portable source also increases.

What is needed therefore is a projector system and a portable electronic device having the projector system addressing the limitations described.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
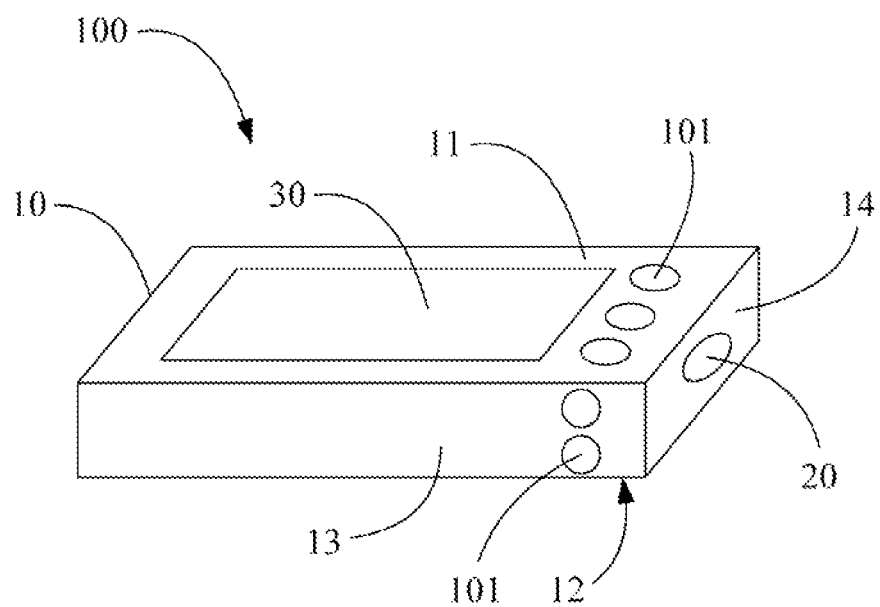
FIG. 1 is an isometric view of a portable electronic device, according to an exemplary embodiment of the present disclosure, the portable electronic device having a projector system.
Figure 2:
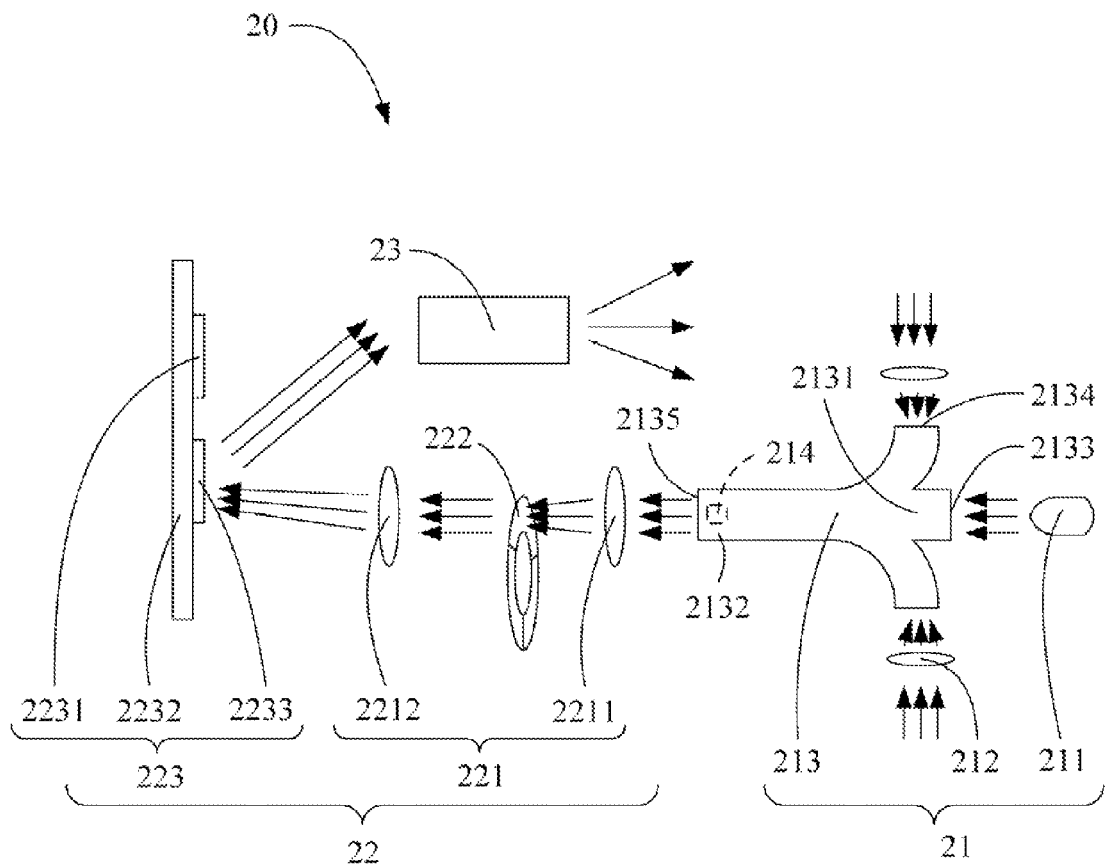
FIG. 2 is a schematic view of the projector system of the portable electronic device of FIG. 1.

Referring to FIGS. 1-2, a portable electronic device 100, according to an exemplary embodiment of the present disclosure, can be a mobile phone or a notebook computer or the like. The portable electronic device 100 includes a housing 10 and a built-in projector system 20 received in the housing 10.

The housing 10 is substantially rectangular. The housing 10 includes an upper operation surface 11, a bottom surface 12 opposite to the operation surface 11, two opposite side surfaces 13 and two opposite end surfaces 14. The portable electronic device 100 includes an operation interface 30 on the operation surface 11. In this embodiment, the operation interface 30 is a touch screen. Alternatively, the operation interface 30 can be a panel with physical button(s). The housing 10 defines a number of through holes 101 for allowing outside light to enter into the housing 10. The number of the through holes 101 can be changed according to requirements. In this embodiment, the through holes 101 are defined in the operation surface 11 and the side surfaces 13.

The projector system 20 includes a light source unit 21, an imaging unit 22 and a projection lens 23.

The light source unit 21 provides light for the projection system 20. The light source unit 21 includes a lamp 211, a number of converging lenses 212, and a light guiding member 213.

The lamp 211 is an electroluminescent member, such as a light emitting diode (LED) or a cold cathode fluorescent lamp (CCFL). The lamp 211 uses electrical power provided by a battery unit (not shown) of the portable electronic device 100.

The converging lenses 212 correspond to the through holes 101 of the housing 10. Each converging lens 212 is positioned to seal a through hole 101 of the housing 101. The converging lenses 212 are configured for collecting and converging outside light into the housing 10. The converging lenses 212 can be convex lenses or Fresnel lenses. In this embodiment, the converging lenses 212 are Fresnel lenses.

The light guiding member 213 guides light of the light source unit 21 to the imaging unit 22. The light guiding member 213 includes a light input end 2131 and a light output end 2132. The light guiding member 213 includes a first light entrance 2133, a number of second light entrances 2134 and a light exit 2135. The first light entrance 2133 and the second light entrances 213 are formed at the light input end 2131, and the light exit 2135 is formed at the light output end 2132. The first light entrance 2133 is opposite to the lamp 211 for allowing light of the lamp 211 to enter into the light guiding member 213. The second light entrances 2134 allow light converged by the converging lenses 212 to enter into the light guiding member 213. In this embodiment, the number of the second light entrances 2134 is three, and the second light entrances 2134 correspond to the converging lenses 212 on the operation surface 10 and the side surfaces 13. The light exit 2135 is opposite to the imaging unit 22 for guiding all light to the imaging unit 22. In this embodiment, the light guiding member 213 is a light pipe.

The light source unit 21 further includes a light detector 214 for detecting light intensity of the light source unit 21. The output power of the lamp 211 can be adjusted according to the detection carried out by the light detector 214. In this embodiment, the light detector 214 is positioned at the light output end 2132 of the light guiding member 213, alternatively, the light detector 214 can be positioned adjacent to the second light entrances 2134 of the light guiding member 213.

The imaging unit 22 modulates light from the light source unit 21 by superimposing image information and transmits modulated light to the projection lens 23. The imaging unit 22 utilizes a liquid crystal on silicon (LCOS) or digital light processing (DLP) technology. In this embodiment, the imaging unit 22 adapts a DLP technology.

The imaging unit 22 includes a lens unit 221, a color wheel 222 and an imaging member 223. The lens unit 221 includes a first lens 2211 and a second lens 2212. The first lens 2211 is positioned on a light path between the light guiding member 213 and the color wheel 222, and the second lens 2212 is positioned on a light path between the color wheel 222 and the imaging member 223. The first lens 2211 and the second lens 2212 adjust the direction of light passing therethrough.

The color wheel 222 splits light passing therethrough into red, blue and green colors.

The imaging unit 223 includes a printed circuit board (PCB) 2232, a processor 2231 and a digital micro-mirror device (DMD) 2233. The processor 2231 and the DMD 2233 are positioned on the PCB 2232 and communicate via the PCB 2231. The processor 2231 controls the DMD 2233 to modulate light with the image information.

The projection lens 23 projects modulated light out of the housing 10. The projection lens 23 can be mounted on any of the operation surface 11, the bottom surface 12, the side surfaces 13 or the end surfaces 14. In this embodiment, the projection lens 23 is mounted on one end surface 14.

The projector system 20 and the portable electronic device 100 with the projector system 20 can use outside light as a proportion of projection light, to enhance or reinforce the output power of the lamp 211, allowing a saving in the electrical power consumption of the projector system 20.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A projector system received in a housing, the housing defining a plurality of through holes, the projector system comprising:
a light source unit configured for providing projection light;
an imaging unit configured for modulating light from the light source unit into light with information; and
a projection lens configured for projecting modulated light out of the projector system;
wherein the light source unit comprises a lamp, a plurality of converging lenses, and a light guiding member, the light guiding member comprises a light exit, a first light entrance, and a number of second light entrances, the first light entrance is opposite to the lamp for allowing light of the lamp to enter into the light guiding member, the second light entrances allow light converged by the converging lenses to enter into the light guiding member, each of the converging lenses covers a respective one of the through holes of the housing and configured for converging light outside the housing into the light guiding member, and the light guiding member is configured for guiding light converged by the converging lenses and light of the lamp to the imaging unit through the light exit.

2. The projector system of claim 1, wherein the lamp is an electroluminescent member for providing projection light cooperating with the converging lenses.

3. The projector system of claim 1, wherein the light guiding member comprises a light input end close to the light source unit and a light output end facing towards the imaging unit.

4. The projector system of claim 3, wherein the first and second light entrances are positioned at the light input end, and the light exit are positioned at the light output end.

5. The projector system of claim 3, wherein the light exit is opposite to the imaging unit.

6. The projector system of claim 3, wherein the light source unit comprises a light detector for detecting light intensity of the light source unit, and the light detector is positioned at the light output end of the light guiding member.

7. The projector system of claim 1, wherein the light source unit comprises a light detector for detecting light intensity of the light source unit.

8. The projector system of claim 1, wherein the converging lenses are convex lenses or Fresnel lenses.

9. A portable electronic device, comprising:
a housing defining a plurality of through holes; and
a projector system received in the housing, comprising:
a light source unit configured for providing projection light;
an imaging unit configured for modulating light from the light source unit into light with information; and
a projection lens configured for projecting modulated light out of the projector system;
wherein the light source unit comprises a lamp, a plurality of converging lenses, and a light guiding member, the light guiding member comprises a light exit, a first light entrance, and a number of second light entrances, the first light entrance is opposite to the lamp for allowing light of the lamp to enter into the light guiding member, the second light entrances allow light converged by the converging lenses to enter into the light guiding member, each converging lens is positioned to cover a corresponding through hole for converging light outside the housing into the light guiding member, and the light guiding member is configured for guiding light converged by the converging lenses and light of the lamp to the imaging unit and light of the lamp.

10. The portable electronic device of claim 9, wherein the housing is substantially rectangular-shaped, and the housing comprises an upper operation surface, a bottom surface opposite to the operation surface, two side surfaces opposite to each other and two end surfaces opposite to each other.

11. The portable electronic device of claim 10, wherein the through holes are defined in the side surfaces and the operation surface, and the projection lens is mounted on any of the operation surface, the bottom surface, the side surfaces, and the end surfaces.

12. The portable electronic device of claim 9, wherein the lamp is an electroluminescent member for providing projection light cooperating with the converging lenses.

13. The portable electronic device of claim 9, wherein the light guiding member comprises a light input end close to the light source unit and a light output end facing towards the imaging unit.

14. The portable electronic device of claim 13, wherein the first and second light entrances are positioned at the light input end, and the light exit are positioned at the light output end.

15. The portable electronic device of claim 13, wherein the light exit is opposite to the imaging unit.

16. The portable electronic device of claim 13, wherein the light source unit comprises a light detector for detecting light intensity of the light source unit, and the light detector is positioned at the light output end of the light guiding member.

17. The portable electronic device of claim 9, wherein the light source unit comprises a light detector for detecting light intensity of the light source unit.

18. The portable electronic device of claim 1, wherein the converging lenses are convex lenses or Fresnel lenses.

19. The projector system of claim 1, wherein each of the converging lenses seals a respective one of the through holes of the housing.

20. The projector system of claim 1, wherein the light guiding member is a light pipe.